(12) United States Patent
Chen (10) Patent No.: US 9,749,614 B2
(45) Date of Patent: Aug. 29, 2017

(54) IMAGE CAPTURING SYSTEM OBTAINING SCENE DEPTH INFORMATION AND FOCUSING METHOD THEREOF

(71) Applicant: LITE-ON TECHNOLOGY CORPORATION, Taipei (TW)

(72) Inventor: Jau-Yu Chen, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 337 days.

(21) Appl. No.: 14/717,901

(22) Filed: May 20, 2015

(65) Prior Publication Data
US 2016/0050407 A1    Feb. 18, 2016

(30) Foreign Application Priority Data
Aug. 15, 2014   (TW) .............................. 103128116 A (51) Int. Cl.
| | |
|---|---|
| *H04N 13/02* | (2006.01) |
| *H04N 13/00* | (2006.01) |
| *H04N 5/232* | (2006.01) |
| *G06T 7/571* | (2017.01) |
| *G06T 7/593* | (2017.01) |

(52) U.S. Cl.
CPC ......... *H04N 13/0271* (2013.01); *G06T 7/571* (2017.01); *G06T 7/593* (2017.01); *H04N 5/23212* (2013.01); *H04N 13/0022* (2013.01); *H04N 13/0203* (2013.01); *H04N 13/0242* (2013.01); *H04N 2013/0081* (2013.01)

(58) Field of Classification Search
CPC ........... H04N 13/0271; H04N 5/23212; H04N 13/0022; H04N 13/0203; H04N 13/1242; G06T 7/571; G06T 7/593
See application file for complete search history.

(56) References Cited

U.S. PATENT DOCUMENTS

| | | | |
|---|---|---|---|
| 6,674,059 B1 * | 1/2004 | Nakano ................ | G11B 7/1353 250/201.5 |
| 8,477,232 B2 * | 7/2013 | Forutanpour ........... | G06T 7/571 348/239 |
| 2007/0189750 A1 * | 8/2007 | Wong ................. | H04N 5/23212 396/121 |

(Continued)

*Primary Examiner* — Mishawn Hunter
(74) *Attorney, Agent, or Firm* — Li & Cai Intellectual Property (USA) Office (57) ABSTRACT

An image capturing system comprises a first image capturing module, a second image capturing module and a depth map processing/generating device. The first image capturing module having a first lens, a first aperture and a first image sensor generates a first image corresponding to a first optical-wavelength range. The second image capturing module having a second lens, a second aperture, a third aperture and a second image sensor generates a second image of the first optical-wavelength range and a third image of a second optical-wavelength range. The depth map processing/generating device generates a first depth map according to the parallax of the scene observed in the first image and the second image, and generates a second depth map according to the difference/ratio of sharpness/blur between the second image and the third image, therefore wider range of resolving the object distance and accuracy of the image could be both considered.

15 Claims, 6 Drawing Sheets

(56) References Cited

U.S. PATENT DOCUMENTS

| | | | |
|---|---|---|---|
| 2008/0106620 A1* | 5/2008 | Sawachi | H04N 13/0257 348/262 |
| 2009/0268985 A1* | 10/2009 | Wong | G06K 9/209 382/299 |
| 2012/0176423 A1* | 7/2012 | Nagato | G02F 1/133526 345/690 |
| 2012/0242796 A1* | 9/2012 | Ciurea | H04N 5/232 348/46 |
| 2013/0033579 A1 | 2/2013 | Wajs | |
| 2013/0107015 A1* | 5/2013 | Morioka | H04N 13/025 348/48 |
| 2014/0254345 A1* | 9/2014 | Yamasaki | G02B 5/1895 369/112.23 |
| 2015/0009790 A1* | 1/2015 | Ito | G11B 7/1353 369/112.26 |
| 2015/0062907 A1* | 3/2015 | Ng | F21V 9/10 362/293 |
| 2015/0109768 A1* | 4/2015 | Whitmore | F21L 4/022 362/184 |
| 2015/0302573 A1* | 10/2015 | Trouve | G02B 27/0075 348/135 |

* cited by examiner

IMAGE CAPTURING SYSTEM OBTAINING SCENE DEPTH INFORMATION AND FOCUSING METHOD THEREOF

BACKGROUND OF THE INVENTION

1. Field of the Invention

The instant disclosure relates to an image capturing system; in particular, to an image capturing system obtaining scene depth information and a focusing method thereof.

2. Description of Related Art

So far the conventional methods of the related art about depth map can be divided into two kinds: 1. making use of the parallax, for example using a 3D camera or array camera to obtain the information of the parallax to obtain calculated the depth information; 2. utilizing an image capturing module having multi apertures to obtain two images with respectively different optical-wavelength bands (for example, two wavelength bands such as visible light and infrared (IR) light), in which each optical-wavelength band corresponds to one aperture, and the information of depth is obtained according to the difference of sharpness between these two images, as described in US Patent Publication 2013/0033579.

Regarding the aforementioned conventional methods of generating the depth map of the related art, the mentioned first method is limited by the length of the baseline and the size of the sensors, such that the depth information of the scene (or the objects in the scene) at near distance cannot be obtained; on the other hand, the mentioned second method is limited by the difference/ratio of sharpness/blur of these two images, thus the depth information at far distance cannot be obtained, meanwhile, degree of blur of the image is approaching to a constant when the distance between the scene and the image capturing module (also called the camera) is increasing or when the focusing point is farther, such that the difference/ratio of sharpness/blur of these two images of the scene at far distance almost does not change with distance, and the depth of the objects at far distance cannot be identified accordingly.

SUMMARY OF THE INVENTION

The object of the instant disclosure considers the disadvantages of these two kinds of systems in the related art, and provides an image capturing system obtaining scene depth information and a focusing method thereof regarding to calculate depth information of the scene in a great range of distance. Accordingly, greater depth detection range of the scene (or called the resolvable range) can be obtained, and accuracy of the depth information of the scene can be taken into account at the same time. Therefore, the system and the method thereof can be applied to practical applications, for example the focusing system, which needs the depth map with greater distance due to requirements of great distance and high accuracy.

In order to achieve the aforementioned objects, according to an embodiment of the instant disclosure, an image capturing system is provided. The image capturing system comprises a first image capturing module, a second image capturing module and a depth map processing/generating device. The first image capturing module has a first lens, a first aperture and a first image sensor, wherein the first lens is used for imaging the scene to the first image sensor, the first aperture is used to limit the amount of light with a first optical-wavelength range, the first image sensor has a first optical-wavelength detection range, the first image capturing module is used to generate a first image corresponding to the first optical-wavelength range. The second image capturing module has a second lens, a second aperture, a third aperture and a second image sensor, wherein the second lens is used for imaging the scene to the second image sensor, the second aperture is used to limit the amount of light with the first optical-wavelength range, the third aperture is used to limit the amount of light with a second optical-wavelength range, the second image sensor has the first optical-wavelength detection range and a second optical-wavelength detection range, the second image capturing module is used to generate a second image corresponding to the first optical-wavelength range and a third image corresponding to the second optical-wavelength range, there is a distance between the optical axis of the second image capturing module and the optical axis of the first image capturing module. The depth map processing/generating device generates a first depth map according to the parallax of the scene observed in the first image and the second image, and generates a second depth map according to the difference/ratio of sharpness/blur between the second image and the third image.

In order to achieve the aforementioned objects, according to an embodiment of the instant disclosure, a focusing method of an image capturing system is provided. The image capturing system comprises a first image capturing module and a second image capturing module. The first image capturing module is used for generating a first image corresponding to a first optical-wavelength range. The second image capturing module is used for generating a second image corresponding to the first optical-wavelength range and a third image corresponding to a second optical-wavelength range. The focusing method comprises steps as follows. Firstly, generating a first depth map according to the parallax of the scene observed in the first image and the second image, generating a second depth map according to the difference/ratio of sharpness/blur between the second image and the third image, and finding out the depth information of the scene in the first depth map and the second depth map. Then, obtaining the depth information of the scene in at least one of the first depth map and the second depth map.

In order to achieve the aforementioned objectives, according to an embodiment of the instant disclosure, a focusing method of an image capturing system is provided. The image capturing system comprises a first image capturing module and a second image capturing module. The first image capturing module is used for generating a first image corresponding to a first optical-wavelength range. The second image capturing module is used for generating a second image corresponding to the first optical-wavelength range and a third image corresponding to a second optical-wavelength range. The focusing method comprises steps as follows. Firstly, utilizing the first image, the second image and the third image to obtain a combined depth map, and obtaining the depth information of the scene in the combined depth map. Then, utilizing the depth information in the combined depth map to perform focus procedure.

In summary, the instant disclosure provides an image capturing system obtaining scene depth information and a focusing method thereof, which obtains a first depth map according to a first image and a second image, generates a second depth map according to the second image and a third image, and generate great depth detection range of the scene by selection of the first depth map and the second depth map or directly using the combined depth map, and the accuracy of the depth information of the scene can be taken into account at the same time.

In order to further the understanding regarding the instant disclosure, the following embodiments are provided along with illustrations to facilitate the disclosure of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

[An Embodiment of an Image Capturing System]

Figure 1:
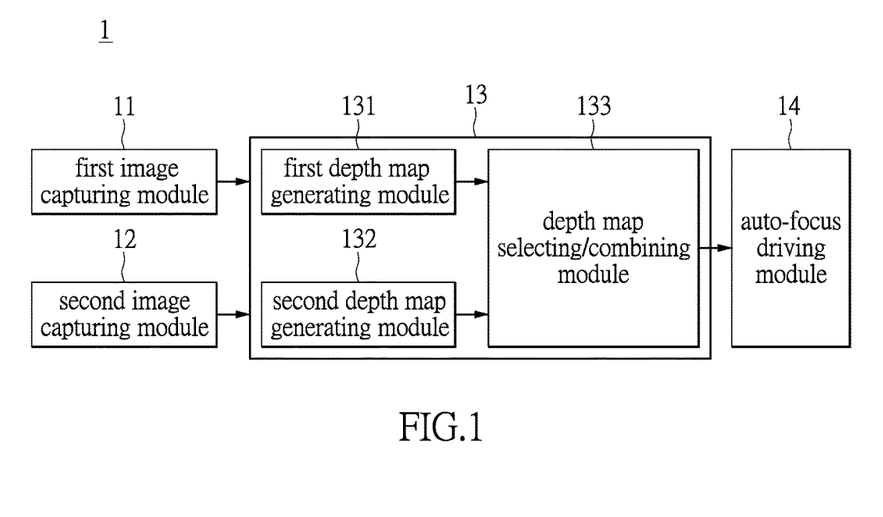
FIG. 1 shows a block diagram of an image capturing system according to an embodiment of the instant disclosure.

Please refer to FIG. 1 showing a block diagram of an image capturing system according to an embodiment of the instant disclosure. The image capturing system 1 comprises a first image capturing module 11, a second image capturing module 12, a depth map processing/generating device 13 and an auto-focus driving module 14. The first image capturing module 11 and the second image capturing module 12 respectively transmit image information to the depth map processing/generating device 13 for processing the images. The depth map processing/generating device 13 may be a microprocessor, a calculator or a computer for example, but the instant disclosure is not so restricted. The auto-focus driving module 14 is used for the focusing operational process. In the embodiment shown in FIG. 1, the depth map processing/generating device 13 comprises a first depth map generating module 131, a second depth map generating module 132 and a depth map selecting/combining module 133.

The first depth map generating module 131 of the depth map processing/generating device 13 is used for receiving a first image coming from the first image capturing module 11 and a second image coming from the second image capturing module 12, and generates the first depth map accordingly. The second depth map generating module 132 is used for receiving the second image and a third image coming from the second image capturing module 12, and generates the second depth map accordingly. The first depth map generated by the first depth map generating module 131 and the second depth map generated by the second depth map generating module 132 are provided to the depth map selecting/combining module 133, for processing the selection or combination of the depth maps. The depth map selecting/combining module 133 may process the function of selecting depth maps or the function of combining depth maps. In another embodiment, the depth map selecting/combining module 133 may be replaced by a depth map selecting module or a depth map combining module. Further, the auto-focus driving module 14 utilizes the selected depth map or the generated depth map made by the combination process to perform the focus procedure, wherein the mentioned focus procedure may be the operational process of focusing controlled by a microprocessor, a calculator or a computer. Furthermore, the first image capturing module 11, the second image capturing module 12, and the generation, selection or combination of depth maps are be referred to in the descriptions hereinafter.

Figure 2:
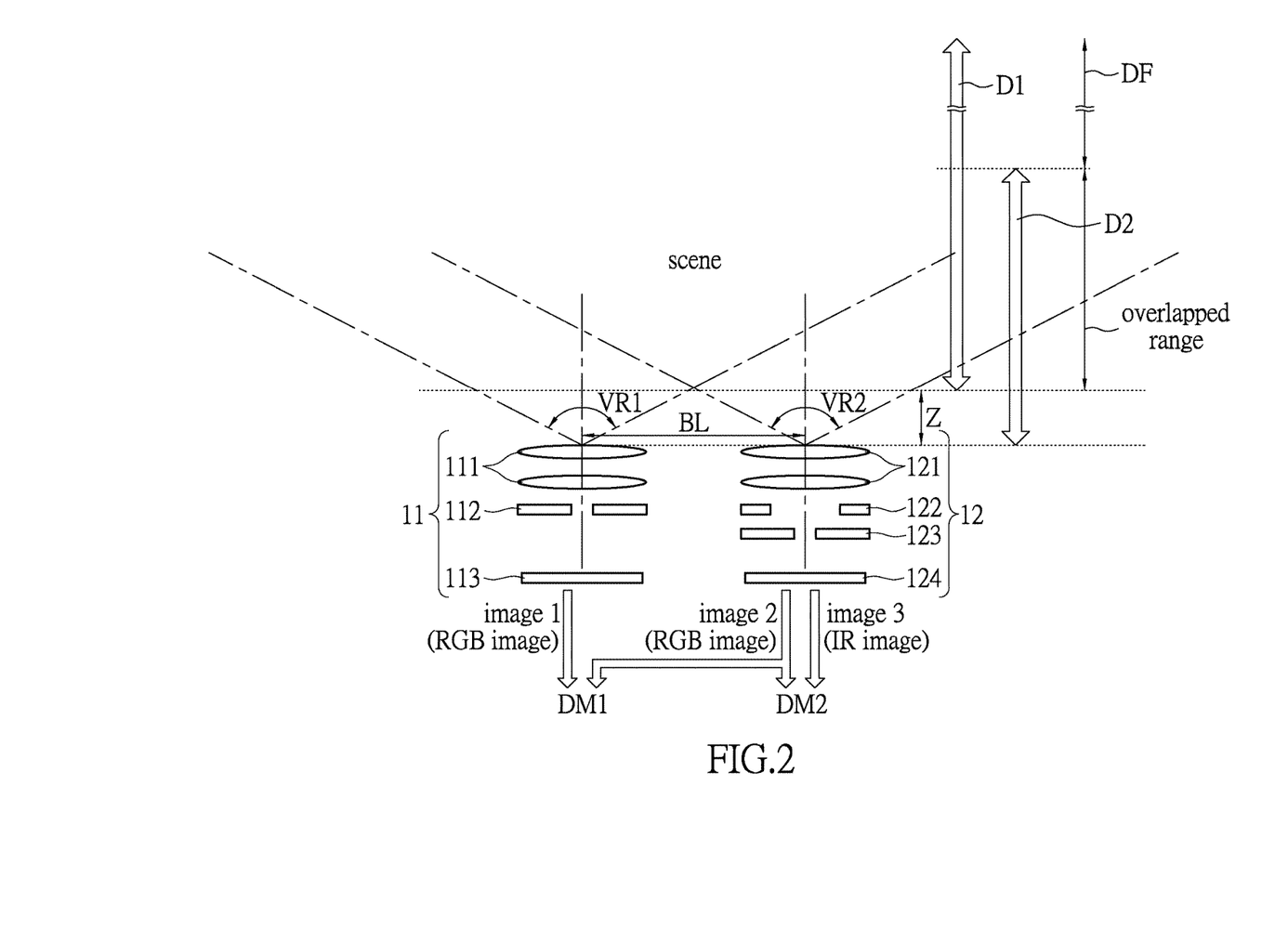
FIG. 2 shows a schematic diagram of a first image capturing module and a second image capturing module according to an embodiment of the instant disclosure.

Then, please refer to FIG. 2 showing a schematic diagram of a first image capturing module and a second image capturing module according to an embodiment of the instant disclosure. The first image capturing module 11 and the second image capturing module 12 respectively have the view angles VR1, VR2. There is a distance BL between the optical axis of the second image capturing module 12 and the optical axis of the first image capturing module 11, wherein the line connecting between the optical axis of the second image capturing module 12 and the optical axis of the first image capturing module 11 is the baseline. The first image capturing module 11 has a first lens 111, a first aperture 112 and a first image sensor 113, wherein the first lens 111 is used for imaging the scene (or shooting the objects in the scene) to the first image sensor 113, the first aperture 112 is used to limit the amount of light with a first optical-wavelength range, the first image sensor 113 has a first optical-wavelength detection range, the first image capturing module 11 is used to generate a first image corresponding to the first optical-wavelength range. The mentioned first optical-wavelength range may be the range of visible light wavelength, and the mentioned first image is depicted by image 1 (RGB image) in FIG. 2.

The second image capturing module 12 has a second lens 121, a second aperture 122, a third aperture 123 and a second image sensor 124, wherein the second lens 121 is used for imaging the scene to the second image sensor 124, the second aperture 122 is used to limit the amount of light with the first optical-wavelength range, the third aperture 123 is used to limit the amount of light with a second optical-wavelength range, the second image sensor 124 has the first optical-wavelength detection range and a second optical-wavelength detection range. The first optical-wavelength range may be the range of visible light, for example. The second optical-wavelength range may be the range of infrared light, for example. The second image capturing module 12 is used to generate a second image corresponding to the first optical-wavelength range and a third image corresponding to the second optical-wavelength range. The mentioned second image is depicted by image 2 (RGB image) in FIG. 2, and the mentioned third image is depicted by image 3 (IR image) in FIG. 2.

Furthermore, the information of a first depth map DM1 could be obtained according to the parallax of the scene in the first image of the visible light observed by the first image capturing module 11 and the second image of the visible light observed by the second image capturing module 12. However, the depth map has a nearest resolvable distance due to the size of the image sensor and the focal length of the lens, wherein the depth information of the scene nearer than the nearest resolvable distance cannot be obtained, and the nearest resolvable distance can be represented by Z=bf/ad, in which "b" is the length of the baseline, "a" is the pixel size, "d" is the maximum pixel difference that can be obtained by the image capturing system, and "f" is the focal length. Because the maximum pixel difference obtained by the image capturing system, "d", is limited by the image capturing system in practical, this can be used to generate the nearest resolvable distance "Z", thus the resolvable range D1 in FIG. 2 is obtained. That is, the resolvable range of the first depth map DM1 is D1.

Relatively, while considering the second image capturing module 12 only, the second image of visible light and the third image of infrared light could be respectively obtained by the second aperture 122 limited to visible light and the third aperture 123 limited to infrared light, wherein the information of the second depth map DM2 can be obtained according to the difference/ratio of sharpness/blur between the second image and the third image, at the same time the second depth map DM2 has a resolvable range D2 (as shown in FIG. 2) limited to the difference or ratio of the increased sharpness/blur for the scene approaching to a constant when the scene gets farther from the focal length or the image capturing module. That is, the resolvable range of the second depth map DM2 is D2, at the same time the extending distance of the resolvable range D2 can be configured to be shorter than the extending distance of the resolvable range D1 by setting the focusing position of the lens. For example, the focal length of the lens of the image capturing module can be set to be shorter than the resolvable range D2 or the focal length of the lens of the image capturing module can be set to infinity. Therefore, the resolvable range D2 is used to solve the problem that the resolvable range D1 cannot resolve the depth information of the scene nearer than the nearest resolvable distance Z. However, this embodiment does not restrict the setting of the focal length of the lens. The focal length of the lens can be set arbitrarily as needed in practical applications. Relatively, for the second image capturing module 12 having the depth information with the resolvable range D2 in the second depth map DM2, the second image and the third image generated by the second image capturing module 12 cannot be used to determine the distance of the scene located at the far range DF. That is, the distance of the scene located at the far range DF can not be determined by the second depth map DM2. At this time, the depth information of the scene located at the far range DF could only be determined according to the first depth map DM1.

Furthermore, it can be seen in FIG. 2, there is an overlapped range covered by the resolvable range D1 of the first depth map DM1 and the resolvable range D2 of the second depth map DM2. That is, the distance (also called the depth), relative to the lens, of the scene (or an object of the scene being captured) at the overlapped range can be obtained by these two image capturing modules which generate the first image and the second image, or only by the second image capturing module 12. The distance of the scene, relative to the lenses (111, 121), shorter than the nearest resolvable distance Z of the first depth map DM1 can only be obtained according to the second image and the third image generated by the second image capturing module 12. Because the second image and the third image are generated respectively corresponding to different optical-wavelength, the depth information of the scene can be obtained according to the difference/ratio of sharpness/blur between the second image and the third image.

In short, after obtaining the first image, the second image and the third image, the depth map processing/generating device 13 generates a first depth map DM1 according to the parallax of the scene observed in the first image and the second image, and generates a second depth map DM2 according to the difference/ratio of sharpness/blur between the second image and the third image In one embodiment, when the depth map selecting/combining module 133 is a depth map combining module only for combining the depth maps. The depth map combining module is used for receiving the first depth map DM1 and the second depth map DM2, and generating a combined depth map according to the first depth map DM1 and the second depth map DM2. The combined depth map may be generated, for example by using weighting or a certain ratio combining the first depth map DM1 and the second map DM2. However, this instant disclosure does not restrict the manner of generating the combined depth map.

In another embodiment, when the depth map selecting/combining module 133 is a depth map selecting module, the depth map selecting module is used for receiving the first depth map DM1 and the second depth map DM2. When the depth information of the scene is only in one of the first depth map DM1 or the second depth map DM2, the depth map selecting module selects the first depth map DM1 having the depth information of the scene or the second depth map DM2 having the depth information of the scene. The auto-focus driving module 14 is used for receiving the depth information of the first depth map DM1 or the depth information of the second depth map DM2 selected by the depth map selecting module, and utilizing the received the depth information of the first depth map DM1 or the depth information of the second depth map DM2 to perform the auto focusing procedure. That is, when an object of the scene is located at a range nearer than the nearest resolvable distance Z or located farther than the far distance range DF, the second depth map DM2 and the first depth map DM1 are respectively utilized for obtaining the depth information of the scene. On the other hand, when the object in the scene is at the overlapped range shown in FIG. 2, the depth information of the scene is in both of the first depth map and the second depth map, utilizing the first depth map to perform the focusing procedure, or selecting one of the first depth map or the second depth map according to their accuracy to perform the focusing procedure. In general, the first depth map DM1 is sufficient to support focusing the scene located at the overlapped region shown in FIG. 2, thus using the first depth map DM1 directly could simplify the focus procedure. In practical applications, for the same scene, the depth information of the scene in the first depth map DM1 and the depth information of the scene in the second depth map DM2 may not be exactly the same. We can adopt the accuracy of the depth information as the basis of determining whether to make use of the first depth map DM1 or the second depth map DM2 to perform the focus procedure. The mentioned accuracy is the accuracy of the depth information of the scene in the first depth DM1 and the second depth DM2, in which the accuracy is determined by hardware parameters such as the optical limited pixels of the first image capturing module 11 and the second image capturing module 12 in practical applications. The accuracy is also related to the accuracy of the algorithm for the mathematical operation of the image contents made by the first depth map generating module 131 and the second depth map generating module 132. However, this instant disclosure does not restrict the method for evaluating the accuracy of the first depth map DM1 and the second depth map DM2.

[An Embodiment of a Focusing Method of an Image Capturing System]

Figure 3:
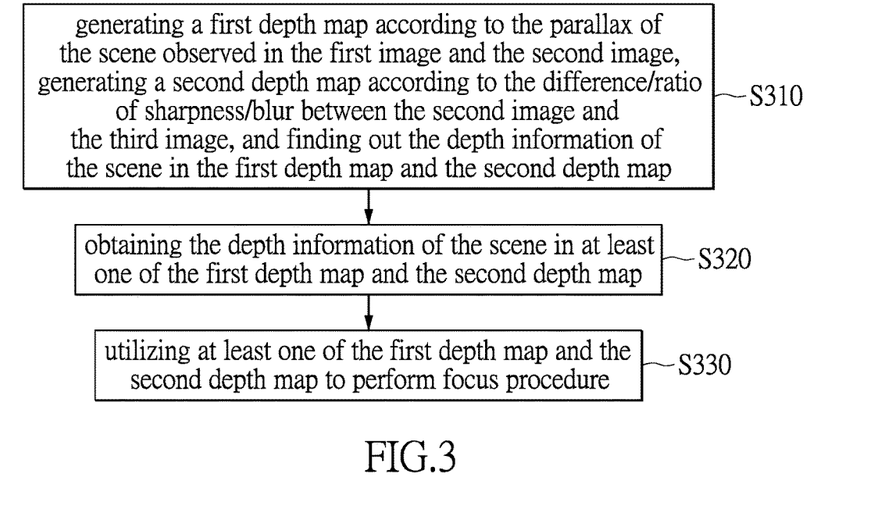
FIG. 3 shows a flow chart of a focusing method of an image capturing system according to an embodiment of the instant disclosure.

Please refer to FIG. 3 showing a flow chart of a focusing method of an image capturing system according to an embodiment of the instant disclosure. The focusing method of an image capturing system shown in FIG. 3 can be implemented by the image capturing system 1 described in the previous embodiment, wherein the depth map selecting/combining module 133 is a depth map selecting module for performing function of depth map selection. Firstly, in step S310, generating a first depth map DM1 according to the parallax of the scene observed in the first image and the second image, generating a second depth map DM2 according to the difference/ratio of sharpness/blur between the second image and the third image, and finding out the depth information of the objects of the scene in the first depth map DM1 and the second depth map DM2. Then, in step S320, obtaining the depth information of the scene in at least one of the first depth map DM1 and the second depth map DM2. Then, in step S330, utilizing at least one of the first depth map DM1 and the second depth map DM2 to perform focus procedure.

Figure 4:
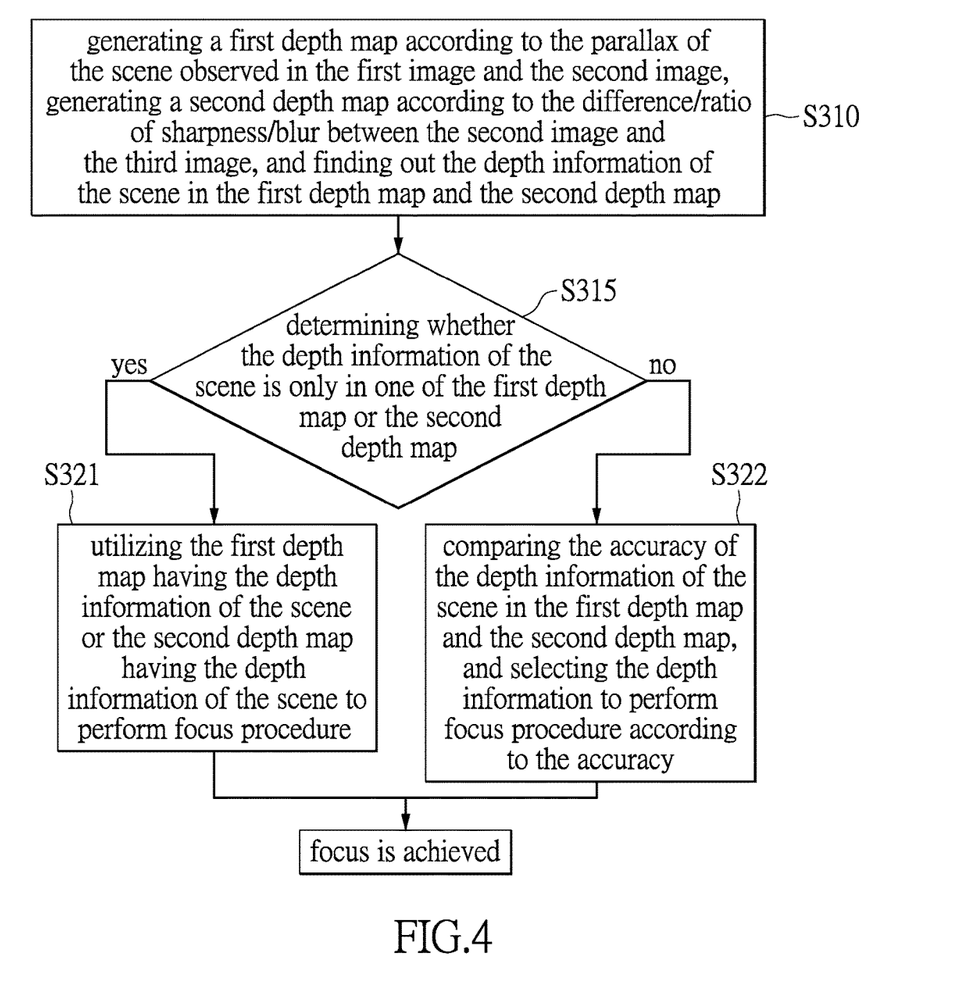
FIG. 4 shows a flow chart of a focusing method of an image capturing system according to another embodiment of the instant disclosure.

Then, please refer to FIG. 4 showing a flow chart of a focusing method of an image capturing system according to another embodiment of the instant disclosure. In this embodiment, we further describe a feasible implementation of step S320 and step S330 of FIG. 3. Firstly, as described in the step S310 of FIG. 3, generating a first depth map DM1 according to the parallax of the scene observed in the first image and the second image, generating a second depth map DM2 according to the difference/ratio of sharpness/blur between the second image and the third image, and finding out the depth information of the objects of the scene in the first depth map DM1 and the second depth map DM2. Then, in step S315, determining whether the depth information of the scene is only in one of the first depth map DM1 or the second depth map DM2. Then, when the depth information of the scene is only in one of the first depth map DM1 or the second depth map DM2, executing step S321. That is, executing step S321 when the depth of the scene is not at the overlapped region of FIG. 2. In step S321, utilizing the first depth map DM1 having the depth information of the scene or the second depth map DM2 having the depth information of the scene to perform focus procedure. When the depth information of the scene is in both of the first depth map and the second depth map, executing step S322, comparing the accuracy of the depth information of the scene in the first depth map DM1 and the second depth map DM2, and selecting the depth information to perform focus procedure according to the accuracy. In practical applications, step S322 could use the depth information with higher accuracy to perform focus procedure.

Figure 5:
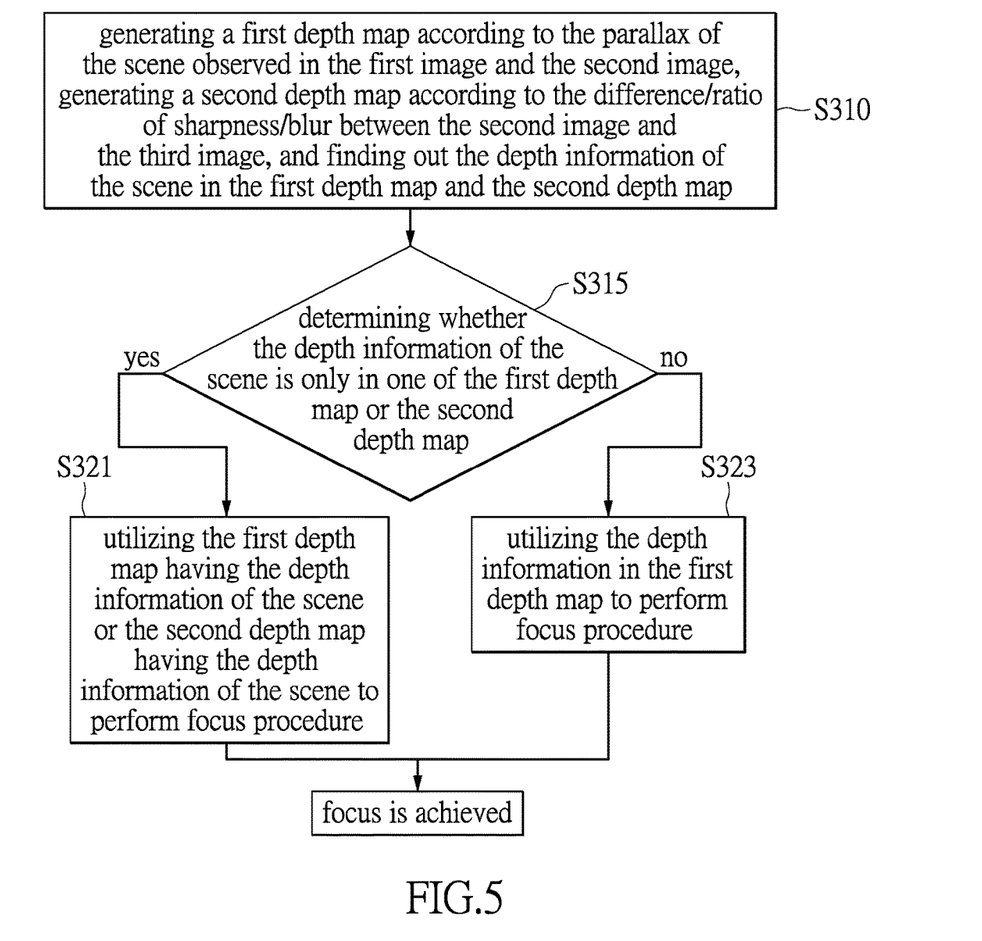
FIG. 5 shows a flow chart of a focusing method of an image capturing system according to another embodiment of the instant disclosure.

Then, please refer to FIG. 5 showing a flow chart of a focusing method of an image capturing system according to another embodiment of the instant disclosure. The flow chart shown in FIG. 5 is significantly identical to the flow chart shown in FIG. 4 except that step S322 of FIG. 4 is replaced by step S323. When the depth information of the scene is in both of the first depth map DM1 and the second depth map DM2, executing step S323, directly utilizing the depth information in the first depth map DM1 to perform focus procedure.

Figure 6:
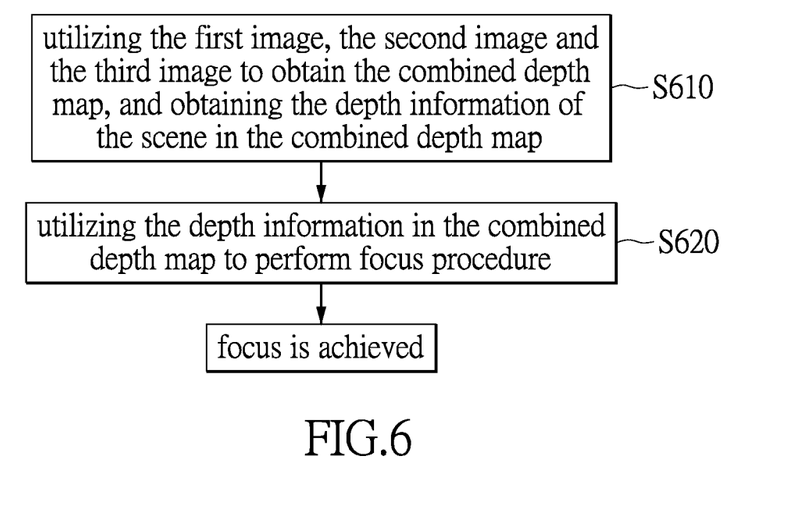
FIG. 6 shows a flow chart of a focusing method of an image capturing system according to another embodiment of the instant disclosure.

Then, please refer to FIG. 6 showing a flow chart of a focusing method of an image capturing system according to another embodiment of the instant disclosure. The flow chart shown in FIG. 6 could also be implemented by image capturing system 1 described in FIG. 1 and FIG. 2, wherein the depth map selecting/combining module 133 of the image capturing module 1 is a depth map combining module for performing the function of combining the depth maps. Firstly, in step S610, utilizing the first image, the second image and the third image to obtain the combined depth map, and obtaining the depth information of the scene in the combined depth map. Specifically, in step S610 of combining depth maps, generating the first depth map DM1 according to the parallax of the scene observed in the first image and the second image, generating a second depth map DM2 according to the difference/ratio of sharpness/blur between the second image and the third image, and generating the combined depth map according to the first depth map and the second depth map. Then, executing step S620, utilizing the depth information in the combined depth map to perform focus procedure.

According to above descriptions, the provided image capturing system obtaining scene depth information and the focusing method thereof in the embodiments can obtain a first depth map according to a first image and a second image, generate a second depth map according to the second image and a third image, and generate greater depth detection range of the scene by selection of the first depth map and the second depth map or directly using the combined depth map, and accuracy of the depth information of the scene can be taken into account at the same time. Furthermore, because a greater depth map range (from near position to far position) can be obtained, the mentioned depth map can be used to achieve the function of fast focusing and re-focusing, so as to improve the application value of the image capturing module.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. An image capturing system, comprising:
   a first image capturing module, having a first lens, a first aperture and a first image sensor, wherein the first lens is used for imaging a scene to the first image sensor, the first aperture is used to limit the amount of light with a first optical-wavelength range, the first image sensor has a first optical-wavelength detection range, the first image capturing module is used to generate a first image corresponding to the first optical-wavelength range;
   a second image capturing module, having a second lens, a second aperture, a third aperture and a second image sensor, wherein the second lens is used for imaging the scene to the second image sensor, the second aperture is used to limit the amount of light with the first optical-wavelength range, the third aperture is used to limit the amount of light with a second optical-wavelength range, the second image sensor has the first optical-wavelength detection range and a second optical-wavelength detection range, the second image capturing module is used to generate a second image corresponding to the first optical-wavelength range and a third image corresponding to the second optical-wavelength range, there is a distance between the optical axis of the second image capturing module and the optical axis of the first image capturing module; and
   a depth map processing/generating device, generating a first depth map according to the parallax of the scene observed in the first image and the second image, and generating a second depth map according to the difference/ratio of sharpness/blur between the second image and the third image.

2. The image capturing system according to claim 1, wherein the depth map processing/generating device further comprises:
   a first depth map generating module, used for receiving the first image and the second image, and generating the first depth map accordingly; and
   a second depth map generating module, used for receiving the second image and the third image, and generating the second depth map accordingly.

3. The image capturing system according to claim 2, wherein the depth map processing/generating device further comprises:
   a depth map combing module, used for receiving the first depth map and the second depth map, and generating a combined depth map according to the first depth map and the second depth map.

4. The image capturing system according to claim 2, wherein the depth map processing/generating device further comprises:
   a depth map selecting module, used for receiving the first depth map and the second depth map, selecting the first depth map having the depth information of the scene or the second depth map having the depth information of the scene when the depth information of the scene is only in one of the first depth map or the second depth map, or selecting the first depth map when the depth information of the scene is in both of the first depth map and the second depth map.

5. The image capturing system according to claim 2, wherein the depth map processing/generating device further comprises:
   a depth map selecting module, used for receiving the first depth map and the second depth map, when the depth information of the scene is only in one of the first depth map or the second depth map, selecting the first depth map having the depth information of the scene or the second depth map having the depth information of the scene, or when the depth information of the scene is in both of the first depth map and the second depth map selecting one of the first depth map and the second depth map according to the accuracy.

6. The image capturing system according to claim 3, further comprising:
   an auto-focus driving module, wherein the auto-focus driving module performs auto focusing procedure according to the combined depth map.

7. The image capturing system according to claim 4, further comprising:
   an auto-focus driving module, used for receiving the first depth map or the second depth map selected by the depth map selecting module, and utilizing the received first depth map or the second depth map to perform auto focusing procedure.

8. The image capturing system according to claim 5, further comprising:
   an auto-focus driving module, used for receiving the first depth map or the second depth map selected by the depth map selecting module, and utilizing the received first depth map or the second depth map to perform auto focusing procedure.

9. A focusing method of an image capturing system according to claim 1, the focusing method comprising: the focusing method comprising: generating a first depth map according to the parallax of the scene observed in the first image and the second image, generating a second depth map according to the difference/ratio of sharpness/blur between the second image and the third image, and finding out the depth information of the scene in the first depth map and the second depth map; and obtaining the depth information of the scene in at least one of the first depth map and the second depth map.

10. The focusing method of the image capturing system according to claim 9, wherein the first image capturing module has a first lens, a first aperture and a first image sensor, the first lens is used for imaging the scene to the first image sensor, the first aperture is used to limit the amount of light with the first optical-wavelength range, the first image sensor has a first optical-wavelength detection range, the first image capturing module is used to generate the first image corresponding to the first optical-wavelength range, wherein the second image capturing module has a second lens, a second aperture, a third aperture and a second image sensor, the second lens is used for imaging the scene to the second image sensor, the second aperture is used to limit the amount of light with the first optical-wavelength range, the third aperture is used to limit the amount of light with the second optical-wavelength range, the second image sensor has the first optical-wavelength detection range and a second optical-wavelength detection range, the second image capturing module is used to generate the second image corresponding to the first optical-wavelength range and the third image corresponding to the second optical-wavelength range, there is a distance between the optical axis of the second image capturing module and the optical axis of the first image capturing module.

11. The focusing method of the image capturing system according to claim 9, further comprising:
   utilizing the first depth map having the depth information of the scene or the second depth map having the depth information of the scene to perform focus procedure, when the depth information of the scene is only in one of the first depth map or the second depth map.

12. The focusing method of the image capturing system according to claim 9, further comprising:
   utilizing the depth information in the first depth map to perform focus procedure, when the depth information of the scene is in both of the first depth map and the second depth map.

13. The focusing method of the image capturing system according to claim 9, further comprising:
   comparing the accuracy of the depth information in the first depth map and the second depth map, and selecting the depth information according to the accuracy, when the depth information of the scene is in both of the first depth map and the second depth map.

14. A focusing method of an image capturing system according to claim 1, the focusing method comprising:
   utilizing the first image, the second image and the third image to obtain a combined depth map, and obtaining the depth information of the scene in the combined depth map; and utilizing the depth information in the combined depth map to perform a focus procedure.

15. The focusing method of the image capturing system according to claim 14, wherein in the step of obtaining the combined depth map, generating a first depth map according to the parallax of the scene observed in the first image and the second image, generating a second depth map according to the difference/ratio of sharpness/blur between the second image and the third image, and generating the combined depth map according to the first depth map and the second depth map.

\* \* \* \* \*